US012704103B2

(12) United States Patent
Hahn et al.

(10) Patent No.: US 12,704,103 B2
(45) Date of Patent: Aug. 11, 2026

(54) GROOVED INJECTOR NOZZLE COMBUSTION SHIELD

(71) Applicant: Cummins Inc., Columbus, IN (US)

(72) Inventors: Thomas O. Hahn, Columbus, IN (US); Terry L. Johnson, Otisco, IN (US); Aamir Ibrahim, Seymour, IN (US); Raheel Ahmed, Columbus, IN (US); Joseph A. Worthington, Scipio, IN (US); Chandan Mahato, Columbus, IN (US)

(73) Assignee: Cummins Inc., Columbus, IN (US)

( * ) Notice: Subject to any disclaimer, the term of this patent is extended or adjusted under 35 U.S.C. 154(b) by 8 days.

(21) Appl. No.: 19/046,109

(22) Filed: Feb. 5, 2025

(65) Prior Publication Data

US 2025/0179980 A1 Jun. 5, 2025

Related U.S. Application Data

(63) Continuation of application No. 18/313,620, filed on May 8, 2023, now Pat. No. 12,228,100, which is a continuation of application No. 17/778,618, filed as application No. PCT/US2020/062830 on Dec. 2, 2020, now Pat. No. 11,674,486.

(60) Provisional application No. 62/942,318, filed on Dec. 2, 2019.

(51) Int. Cl.

| | |
|---|---|
| ***F02M 53/04*** | (2006.01) |
| ***F02M 61/14*** | (2006.01) |
| *F02F 1/24* | (2006.01) |

(52) U.S. Cl.
CPC ............ *F02M 53/04* (2013.01); *F02M 61/14* (2013.01); *F02F 1/242* (2013.01)

(58) Field of Classification Search
CPC .. F02M 2200/858; F02M 61/10; F02M 53/04; F02M 61/14; F02M 53/046; F02M 61/166; F02F 1/242
See application file for complete search history.

(56) References Cited

U.S. PATENT DOCUMENTS 3,334,617 A 8/1967 Palkowsky
4,589,596 A 5/1986 Stumpp et al.
5,345,913 A 9/1994 Belshaw et al.
(Continued)

FOREIGN PATENT DOCUMENTS

DE 1526709 A1 3/1970
DE 3000061 C2 7/1981
(Continued)

OTHER PUBLICATIONS

Extended European Search Report, Counter EP Application No. 20897211.7, Dated Oct. 18, 2023, 7 pgs.
(Continued)

*Primary Examiner* — Hung Q Nguyen
(74) *Attorney, Agent, or Firm* — Taft, Stettinius & Hollister LLP

(57) ABSTRACT

An injector seal assembly including a nozzle combustion shield is disclosed, the thermally conductive component of the injector seal assembly defining at least one groove to allow fluid communication between the main combustion chamber and a gap defined by a fuel injector and the injector seal assembly to facilitate the prevention of corrosion of the components.

20 Claims, 3 Drawing Sheets

(56) References Cited

U.S. PATENT DOCUMENTS

| | | | |
|---|---|---|---|
| 6,755,355 B2 | 6/2004 | Whittaker | |
| 7,513,242 B2 | 4/2009 | Morris | |
| 7,832,377 B2 | 11/2010 | Lee et al. | |
| 8,015,815 B2 | 9/2011 | Pelletier | |
| 9,410,520 B2 | 8/2016 | Franks et al. | |
| 10,364,784 B2 | 7/2019 | Kuylenstierna et al. | |
| 11,174,827 B1 | 11/2021 | Tatikonda et al. | |
| 2003/0155432 A1* | 8/2003 | Buchanan | F02M 61/14 239/132.3 |
| 2004/0040543 A1 | 3/2004 | Michelson | |
| 2009/0235898 A1 | 9/2009 | Short | |
| 2011/0067653 A1 | 3/2011 | Clark et al. | |
| 2011/0265767 A1 | 11/2011 | Xu et al. | |
| 2012/0217323 A1 | 8/2012 | Martinsson et al. | |
| 2015/0013644 A1 | 1/2015 | Friedrich et al. | |
| 2015/0040857 A1 | 2/2015 | Franks et al. | |
| 2016/0138540 A1 | 5/2016 | Franks et al. | |
| 2017/0051713 A1 | 2/2017 | Peters et al. | |

FOREIGN PATENT DOCUMENTS

| | | | | |
|---|---|---|---|---|
| DE | 3623221 A | 2/1988 | |
| DE | 19941930 A1 * | 3/2001 | F02M 61/14 |
| DE | 10027662 A1 | 12/2001 | |
| DE | 60020463 T2 | 4/2006 | |
| DE | 102009001191 A1 * | 9/2009 | F02M 61/166 |
| DE | 102011089295 A1 | 6/2013 | |
| DE | 102012205699 A1 * | 10/2013 | F02M 61/14 |
| EP | 1081374 A1 | 3/2001 | |
| EP | 2336548 A1 | 6/2011 | |
| GB | 901338 A | 7/1960 | |
| JP | H07293251 A * | 11/1995 | F02M 61/14 |
| WO | 2017067855 A1 | 4/2017 | |

OTHER PUBLICATIONS

International Search Report and Written Opinion, PCT Appln. No. PCTUS20062830, Mar. 2, 2021, 11 pgs.

Second Office Action issued by the China National Intellectual Property Administration (English Translation Attached), dated Oct. 26, 2023, for related Chinese Application No. 2023041301462290; 16 pg.

First Office Action issued by the China National Intellectual Property Administration (English Translation Attached), dated Apr. 13, 2023, for related Chinese Application No. 2023041301462290; 20 pg., 20.

* cited by examiner

GROOVED INJECTOR NOZZLE COMBUSTION SHIELD

CROSS-REFERENCE TO RELATED APPLICATIONS

This application is a continuation of U.S. application Ser. No. 18/313,620 filed May 8, 2023, which is a continuation of U.S. application Ser. No. 17/778,618, filed May 20, 2022 now U.S. Pat. No. 11,674,486 issued Jun. 13, 2023, which is a national stage application of International Patent Application No. PCT/US2020/062830, filed Dec. 2, 2020, which claims priority to U.S. Provisional Application No. 62/942,318, filed on Dec. 2, 2019, the disclosure of each of which is hereby expressly incorporated by reference in its entirety.

FIELD OF THE DISCLOSURE

The present disclosure relates generally to fuel injector seal assemblies for internal combustion engines and, more specifically, to nozzle combustion shields configured to transfer heat from a fuel injector nozzle to an engine cylinder head for the reduction of temperature of the fuel injector nozzle.

BACKGROUND OF THE DISCLOSURE

During operation of an internal combustion engine, the tip of a fuel injector may reach excessively high temperatures resulting from reduced fuel flow through the injector, especially in engines having a high compression ratio. It is possible the tip of the fuel injector may reach temperatures beyond the safe material mechanical limits of the fuel injector, causing damage or mechanical failure. High temperatures in the tip of the fuel injector may also facilitate the formation of deposits within the nozzle due to fuel coking. Solutions to ensure that the temperature of the tip of the fuel injector remains within a safe range have been proposed.

For example, nozzle combustion shields are known to facilitate temperature management of the tips of fuel injectors. For example, nozzle combustion shields are configured to transfer heat from the tip of the fuel injector to the corresponding engine cylinder head to ensure that the temperature of the tip of the fuel injector stays below the maximum temperature safe for the material mechanical limits of the fuel injector. However, in some uses of the nozzle combustion shield, corrosion may occur at the nozzle shoulder, which may result in nozzle failure.

SUMMARY OF THE DISCLOSURE

An injector seal assembly including a nozzle combustion shield is disclosed, the thermally conductive component of the injector seal assembly defining at least one groove to allow fluid communication between the main combustion chamber and a gap defined by a fuel injector and the injector seal assembly to facilitate the prevention of corrosion of the components.

In an embodiment of the present disclosure, an injector seal is disclosed. The injector seal comprises a seal component formed of a first material and a thermally conductive component coupled to the seal component. The thermally conductive component comprises a first portion positioned adjacent to the seal component and defining and end surface, the end surface including at least one groove. The thermally conductive component is formed of a second material having a higher thermal conductivity than the first material.

The first material may be comprised of stainless steel. The second material may be comprised of copper. The thermally conductive component may be independently movable relative to the seal component. The first portion of the thermally conductive component may define a head portion, the thermally conductive component further comprising a nozzle portion and a longitudinally extending portion separating the head portion from the nozzle portion. The nozzle portion of the thermally conductive component may comprise a wraparound feature. The end surface may include at least two grooves. The injector seal may be configured to be positioned annularly around a fuel injector. The injector seal may form a full-press fit with the fuel injector.

In another embodiment of the present disclosure, an internal combustion engine is disclosed. The internal combustion engine includes a fuel injector assembly for mounting in an engine cylinder head. The internal combustion engine comprises a cylinder head defining a bore, the bore defining a sidewall surface; a fuel injector body including a longitudinal axis, a nozzle housing defining a tip portion, and a retainer; and an injector seal assembly positioned between the fuel injector body and the sidewall surface. The injector seal assembly comprises a seal component formed of a first material, the seal component positioned in a space formed longitudinally between the fuel injector body and the sidewall surface, and a thermally conductive component positioned radially between the nozzle housing and the seal component and coupled to the seal component. The thermally conductive component is formed of a second material, the second material having a higher thermal conductivity than the first material and configured to transfer head from the nozzle housing to the seal component. The thermally conductive component comprises a first portion positioned adjacent to the seal component and defining an end surface, the end surface including at least one groove and a second portion positioned adjacent to the tip portion of the nozzle housing.

The injector seal assembly may couple to the fuel injector via an interference fit. The injector seal assembly may form a full-press fit with the fuel injector. The thermally conductive component may be configured to facilitate a substantial transfer of heat away from the nozzle housing. The thermally conductive component may include a thermal coating disposed on at least a portion of the thermally conductive component. The thermal coating may comprise a plasma spray zirconia coating. The thermal coating may comprise a sol gel material. The thermal coating may have a thickness of approximately 0.5 millimeters. The first portion of the thermally conductive component may comprise a head portion, the head portion and the fuel injector body defining a gap to allow the thermally conductive component to move longitudinally along a longitudinal axis of the fuel injector body. The end surface may include at least two grooves.

In yet another embodiment of the present disclosure, an internal combustion engine is disclosed. The internal combustion engine includes a fuel injector assembly for mounting in an engine cylinder head. The internal combustion engine comprising a cylinder head defining a bore, the bore defining a sidewall surface; a fuel injector body including a longitudinal axis, a nozzle housing defining a tip portion, and a retainer; and an injector seal assembly positioned between the fuel injector body and the sidewall surface. The injector seal assembly comprises a seal component formed of a first material, the seal component positioned in a space formed longitudinally between the fuel injector body and the sidewall surface, and a thermally conductive component positioned radially between the nozzle housing and the seal component and coupled to the seal component. The thermally conductive component is formed of a second material, the second material having a higher thermal conductivity than the first material and configured to transfer heat from the nozzle housing to the seal component. The thermally conductive component comprises a first portion positioned adjacent to the seal component, the first portion defining an end surface, and the end surface including one groove. The thermally conductive component comprises a second portion positioned adjacent to the tip portion of the nozzle housing and wrapped around the tip portion of the nozzle housing.

The thermally conductive component may substantially overlap the tip portion of the nozzle housing. The end surface may include at least two grooves.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary embodiments taken in conjunction with the accompanying drawings, wherein.

Figure 1:
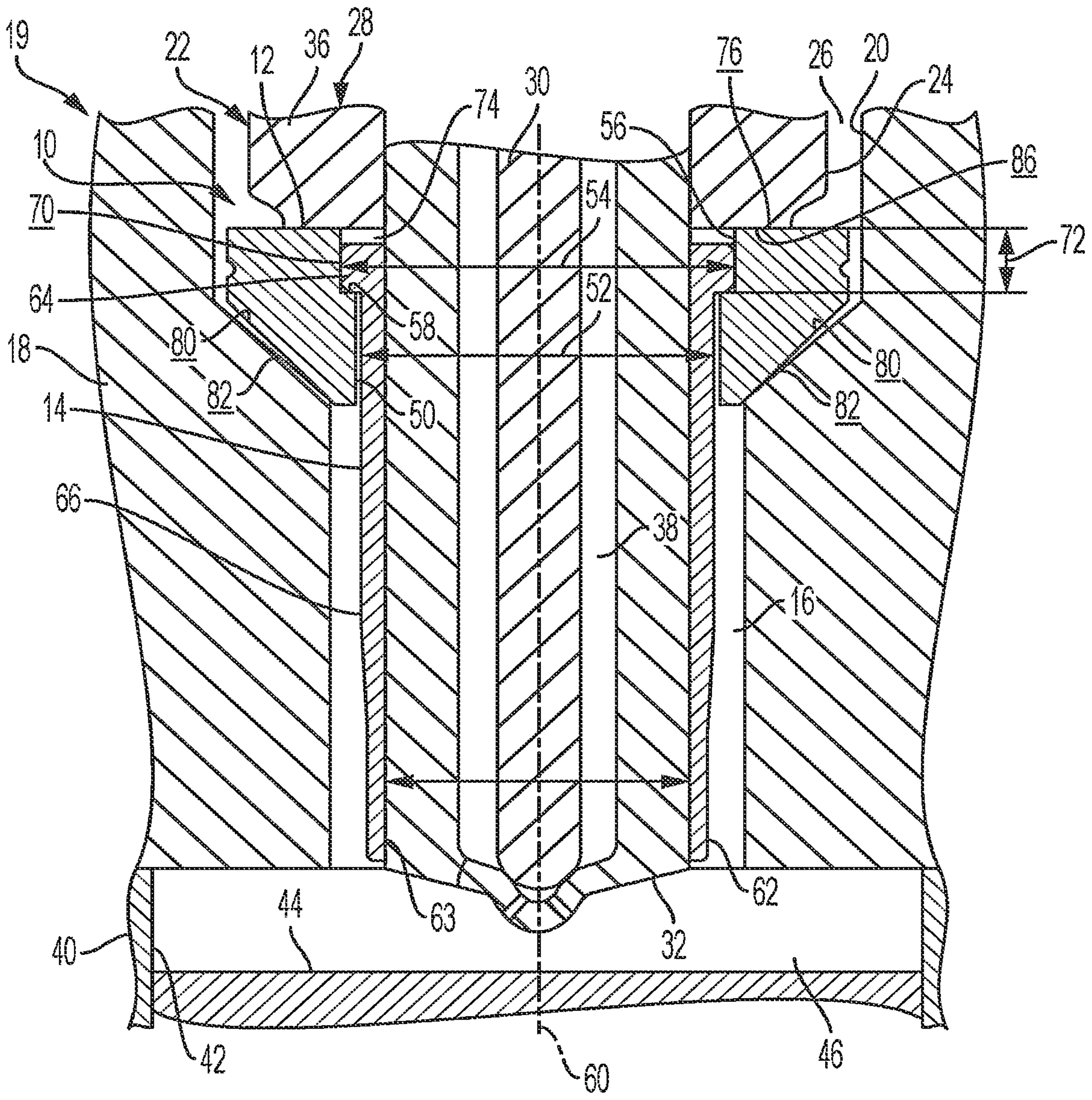
FIG. 1 is a cross-sectional view of an injector seal assembly in accordance with an exemplary embodiment of the present disclosure positioned within an engine mounting bore.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

Referring initially to FIG. 1, an engine body 19 of an engine is shown. The engine body 19 includes an engine block 40 defining at least one cylinder 42. A piston 44 is positioned within each cylinder 42 so that the piston 44 may reciprocally move along a longitudinal axis 60 of the cylinder. The engine body 19 further includes a cylinder head 18 corresponding to the cylinder 42 and coupled to the engine block 40. A combustion chamber 46 is defined by the space formed between the cylinder head 18 and the piston 44.

The cylinder head 18 defines a fuel injector mounting bore, or engine bore 16, defining an interior sidewall surface 20. The engine bore 16 is configured to receive a fuel injector 22, the fuel injector 22 defining an exterior surface 24 and includes an injector body 28 and a nozzle housing 32 defining an outer surface 33 and a tip portion 31, wherein the injector body 28 and the nozzle housing 32 may be coupled via a retainer 36. The injector body 28 and the nozzle housing 32 cooperate to define a nozzle cavity 38. A nozzle valve 30 is received within the nozzle cavity 38, so that the nozzle valve 30 may reciprocally move along a longitudinal axis 60 of the fuel injector 22 within the nozzle cavity 38. The interior sidewall surface 20 of the engine bore 16 and the exterior surface 24 of the fuel injector 22 defines an annular gap 26 extending radially between the fuel injector 22 and the cylinder head 18. As the piston 44 moves longitudinally toward the fuel injector 22, the fuel injector 22 injects fuel into the combustion chamber 46.

In an exemplary embodiment, an injector seal assembly 10 is positioned around the exterior of the fuel injector 22, separating the annular gap 26 from the combustion chamber 46 to protect the fuel injector 22, the cylinder head 18, and/or other components from damage during the combustion process. The injector seal assembly 10 includes a seal component 12 formed of a first material, and a nozzle combustion shield, or thermally conductive component 14, formed of a second material that is different from the first material. For example, in an illustrative embodiment, the thermal conductivity of the second material has a higher thermal conductivity value than the first material. While the seal component 12 and the thermally conductive component 14 are illustratively formed as distinct or separate components, in the exemplary embodiment the seal component 12 and the thermally conductive component 14 are coupled to form the injector seal assembly 10 in a manner that allows the thermally conductive component 14 to move independently of the seal component 12 which further allows gases to travel between the seal component 12 and the thermally conductive component 14.

The seal component 12 includes a lower ring portion 50 defining a first ring diameter 52, an upper ring portion 56 defining a second ring diameter 54 and a longitudinal length 72, and a transition portion 58 between the upper ring portion 56 and the lower ring portion 50. As shown, in the exemplary embodiment, the second ring diameter 54 is larger than the first ring diameter 52. In other embodiments, the first ring diameter 52 may be larger than the second ring diameter 54. The upper ring portion 56 further defines a ring end surface 76, and the lower ring portion 50 further defines a first sealing surface 82 configured to correspond with a second sealing surface 80 defined by the engine bore 16 to create a fluid-tight fit between the seal component 12 and the engine bore 16. In the exemplary embodiment shown, the ring end surface 76 is a flat, planar surface that is configured to abut or contact a portion of the housing retainer 36 defined by a flat, planar injector body surface 86. The seal component 12 is illustratively positioned longitudinally between the injector body 28 and the second sealing surface 80 defined by the engine bore 16. The injector seal assembly 10 provides a metal to metal combustion seal with contact pressures high enough to yield the seal component 12 into sealing contact against the interior sidewall surface 20 of the engine bore 16 and then maintain that contact pressure with the force from the fuel injector 22, or, in another embodiment, a securement system.

The injector clamping or securing load for securing the fuel injector 22 within the engine bore 16 is relied upon to apply a sealing force to the seal component 12. In an exemplary embodiment, the second sealing surface 80 of the engine bore 16 is positioned at an angle to the longitudinal axis 60 to create a conical sealing surface. In such an embodiment, the first sealing surface 82 of the seal component 12 is also angled to correspond with the second sealing surface 80 of the engine bore 16. The clamp load that holds the fuel injector 22 in the engine bore 16 may transfer the load through a load path that includes the contact between the first sealing surface 82 and the second sealing surface 80, forming a fluid-tight seal between the seal component 12 and the engine body 19. The same clamp load that forms the fluid seal between the seal component 12 and the engine body 19 may also form a load path through the ring end surface 76 and the body surface 86 to create a fluid seal between the seal component 12 and the injector body 28.

In an exemplary embodiment, the seal component 12 is formed of a single unitary piece. In other embodiments, the seal component 12 may be comprised of multiple pieces. The seal component 12 may be comprised of an SAE 303 stainless steel to provide a thermal barrier to the combustion heat which may be present in the combustion chamber 46 during the combustion process. In other embodiments, other materials with suitable thermal conductivity and suitable yield strength may be utilized.

The thermally conductive component 14 has a nozzle portion 62, a head portion 64, and a longitudinally extending portion 66 that connects the nozzle portion 62 to the head portion 64 so that the nozzle portion 62 and the head portion 64 are longitudinally spaced. The thermally conductive component 14 further includes an interior surface 63. In an exemplary embodiment, the thermally conductive component 14 is formed of a single unitary piece. In other embodiments, the thermally conductive component 14 may be comprised of multiple pieces. The thermally conductive component 14 may be comprised of a copper material, such as UNS C15100 or UNS C15000, and may include an HO1 temper. Other materials having suitable thermal conductivity and suitable yield strength may also be utilized. The thermally conductive component 14 is configured to couple to the nozzle housing 32 of the fuel injector 22. In the exemplary embodiment, the thermally conductive component 14 and the nozzle housing 32 couple via an interference fit. For example, during assembly of the fuel injector assembly shown in FIG. 1, the thermally conductive component 14 is positioned on the nozzle housing 32, the inner surface 63 of the thermally conductive component is adjacent to, mates with, abuts, or faces the outer surface 33 of the nozzle housing 32.

As shown in FIG. 1, the thermally conductive component 14 forms a full-press fit with the nozzle housing 32 so that no gaps or substantially no gaps exist between the thermally conductive component 14 and the nozzle housing 32. In other embodiments, an air gap may exist between a portion of the thermally conductive component 14 and the nozzle housing 32 while still allowing for an interference fit between another portion of the thermally conductive component 14 and the nozzle housing 32.

The head portion 64 of the thermally conductive component 14 includes an annular outer surface 70, which defines an exterior diameter that is at least larger than the first ring diameter 52 to facilitate coupling of the thermally conductive component 14 with the seal component 12. The exterior diameter of the annular outer surface 70 may also be larger than the second ring diameter 54, so that when the thermally conductive component 14 is coupled with the seal component 12, the annular outer surface 70 is adjacent to, faces, abuts, or mates with the upper ring portion 56 to form a press or interference-fit with the upper ring portion 56. The head portion 64 further defines a longitudinal length that is less than the longitudinal length 72 of the upper ring portion 56 so that when the thermally conductive component 14 is coupled with the seal component 12 and the injector seal assembly 10 is positioned between the fuel injector 22 and the cylinder head 18, the head portion 64 and the injector body 28 define a gap 74 to allow the thermally conductive component 14 to move longitudinally along axis 60. In another embodiment, the gap 74 may be defined by the head portion 64 and the transition portion 58 of the seal component 12. In yet another embodiment, the gap 74 may be in both locations described. In this position, the head portion 64 is positioned between the injector body 28 and the transition portion 58 of the seal component. The gap 74 prevents the significant clamp loads that may be transmitted from the injector body 28 through the seal component 12 into the cylinder head 18 from being additionally transmitted through the thermally conductive component 14.

When assembled as shown in FIG. 1, the heat created from the combustion process is received by the thermally conductive component 14 from the nozzle housing 32. The heat is then readily conducted from the thermally conductive component 14 into the seal component 12, where the heat may then flow into the fuel injector body 28 and/or the retainer 36. The press or interference-fit configuration between the thermally conductive component 14 and the seal component 12 further facilitate the ability to assemble the injector seal assembly 10 before assembly of the fuel injector assembly, rather than requiring each component to be individually coupled to the fuel injector 22. Further details related to the thermally conductive component 14, the seal component 12, the injector seal assembly 10, and various locations where press or interference-fit can be utilized within the injector seal assembly 10 can be found in U.S. Pat. No. 9,410,520B2 to Franks, et al., the disclosure of which is hereby expressly incorporated by reference in its entirety.

Figure 2:
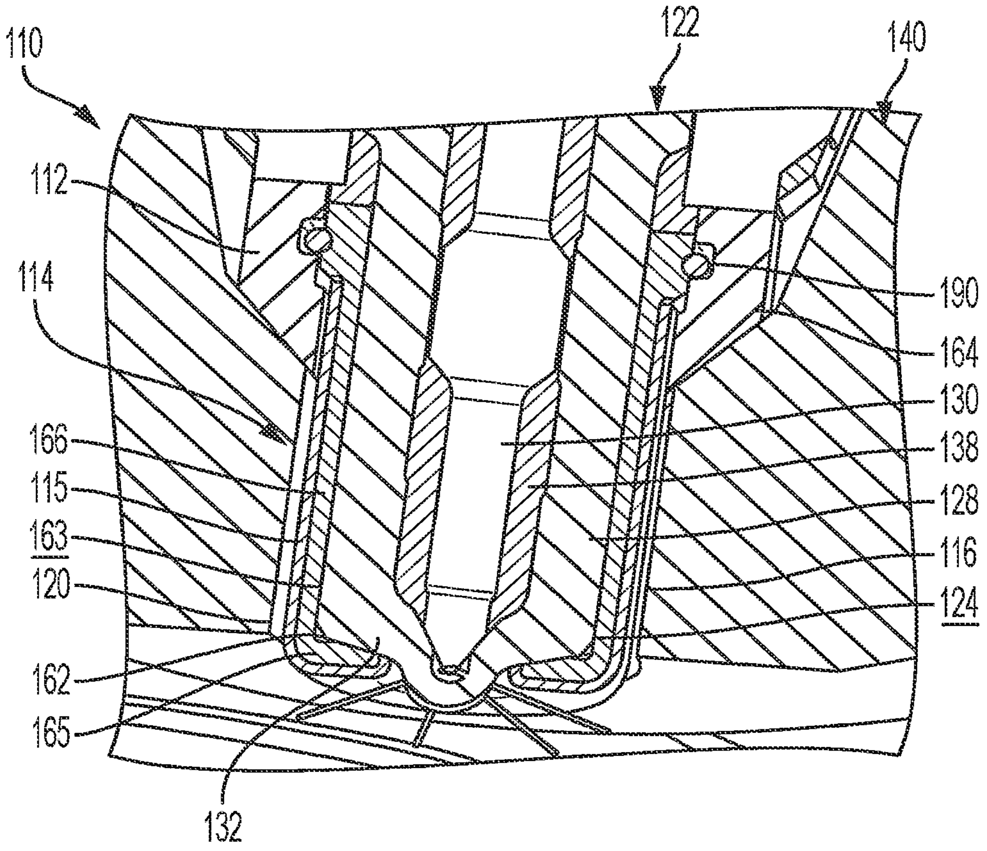
FIG. 2 is a cross-sectional view of another injector seal assembly in accordance with another exemplary embodiment of the present disclosure positioned within an engine mounting bore.

Now referring to FIG. 2, another injector seal assembly 110 is disclosed according to an exemplary embodiment. Descriptions of the injector seal assembly 110 may include one or more elements with substantial similarity to elements previously described in other illustrative embodiments of the present disclosure. Such elements shall be referenced with reference numbers similar to previous elements, with “100” being added to such elements. As such, to the extent that additional descriptions are not provided, reference should be made to the above-mentioned description that are the same or similar to elements disclosed above.

Injector seal assembly 110 includes a thermally conductive component 114, a seal component 112, and a thermal coating 115 disposed on at least a portion of the thermally conductive component 114. In an illustrative embodiment, the thermal coating 115 may be a plasma spray zirconia coating that provides thermal management of fuel injector tip and nozzle temperatures by reducing temperatures experienced by the injector tip and/or nozzle during the combustion process in a combustion chamber of an internal combustion engine. The use of plasma spray zirconia coating 115 may result in a reduced injector tip and/or nozzle temperature of at least 30° to 50° Celsius when exposed to hot combustion gases. In another illustrative embodiment, a material including plasma spray zirconia coating properties generally includes a sol gel material. In yet another embodiment, the coating 115 may have a thickness of approximately 0.5 millimeters.

The thermally conductive component 114 defines an inner surface 163 and includes a head portion 164, a nozzle portion 162, and a longitudinally extending portion 166 extending from the head portion 164 to the nozzle portion 162. The head portion 164, the longitudinally extending portion 166, and at least a portion of the nozzle portion 162 are disposed annularly around the fuel injector 122 so that the exterior surface 124 of the fuel injector 122 contacts the interior surface 163 of the thermally conductive component 114. The nozzle portion 162 further includes a wrap-around or overlapping feature 165 whereby the nozzle portion 162 wraps around the end or tip of the nozzle housing 132. In the exemplary embodiment, the thermal conductive component 114 couples with the nozzle housing 132 via a press or interference-fit. As such, the thermally conductive component 114 substantially overlaps the tip of the fuel injector 122 and therefore facilitates a substantial transfer of heat from the nozzle housing 132 toward cooler portions of the injector bore 116 during the combustion process.

A seal 190 may be inserted between the thermally conductive component 114 and the seal component 112 to further support the coupling between the thermally conductive component 114 and the seal component 112 by retaining the seal component 112 around the thermally conductive component 114 during assembly. The seal 190 may be comprised of rubber or another elastic polymer. In the illustrated embodiment, the seal 190 is comprised of an O-ring. While the seal 190 facilitates assembly, the seal 190 is likely to quickly deteriorate due to the high temperatures within the internal combustion engine, allowing gases to travel between the seal component 112 and the thermally conductive component 114. Further information related to the coating 115 and details of the injector seal assembly described herein can be found in United States Patent Application Publication No. 2017/0051713A1 to Peters, et al. the disclosure of which is hereby incorporated by reference in its entirety.

Figure 3A:
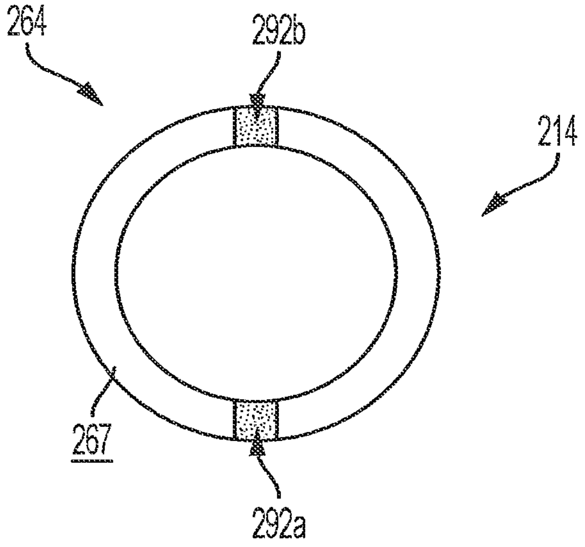
FIG. 3A is a top view of a thermally conductive component in accordance with an exemplary embodiment of the present disclosure.
Figure 3B:
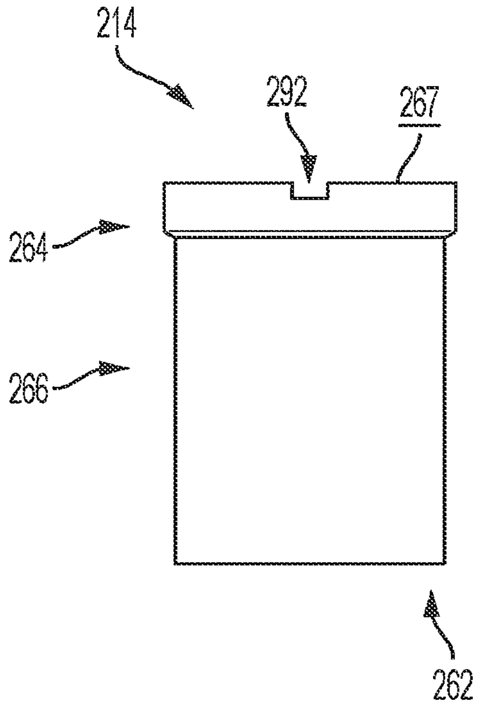
FIG. 3B is a side view of the thermally conductive component of FIG. 3A.
Figure 3C:
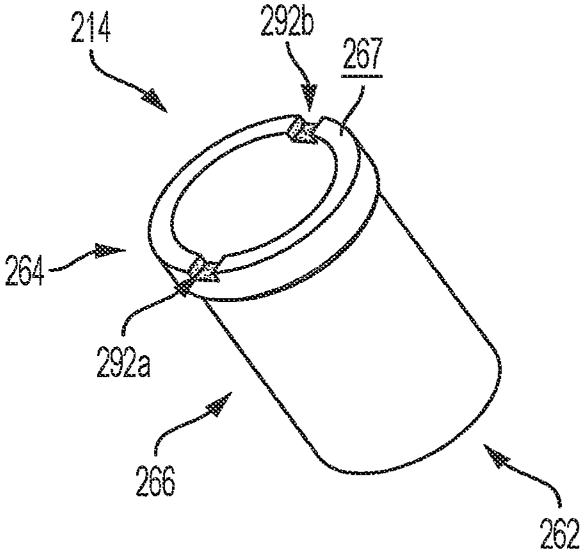
FIG. 3C is a perspective view of the thermally conductive component of FIG. 3A.

Now referring to FIGS. 3A-3C, a thermally conductive component 214 is shown. Descriptions of the thermally conductive component 214 may include one or more elements with substantial similarity to elements previously described in other illustrative embodiments of the present disclosure. Such elements shall be referenced with reference numbers similar to previous elements, with "200" being added to such elements. As such, to the extent that additional descriptions are not provided, reference should be made to the above-mentioned description that are the same or similar to elements disclosed above.

The thermally conductive component 214 is interchangeable with thermally conductive component 14 and thermally conductive component 114 as described herein. The thermally conductive component 214 can further be utilized with any system in which injector seal assemblies are present, including the assemblies described in U.S. Pat. No. 9,897,053B2 to Kolhouse, et al.; U.S. Pat. No. 9,410,520B2 to Franks, et al.; United States Patent Application Publication No. 2017/0051713A1 to Peters, et al.; and PCT Application Publication No. WO2017/027741 to Peters, et al.; the disclosures of which are all hereby incorporated by reference in their entireties.

The thermally conductive component 214 includes a nozzle portion 262, a head portion 264, and a longitudinally extending portion 266. The head portion 264 defines an end surface 267, which may cooperate with the injector body 28 (FIG. 1) to define a gap 74 (FIG. 1). Referring briefly again to FIG. 1, as mentioned above, the gap 74 prevents the significant clamp loads that may be transmitted from the injector body 28 through the seal component 12 into the cylinder head 18 from being additionally transmitted through the thermally conductive component 14. However, the gap 74 may at times trap gases created during the combustion process, creating an acidic environment with the gap 74, which may result in corrosion and increase the chances of nozzle failure.

Referring again to FIGS. 3A-3C, the thermally conductive component 214 comprises at least one groove 292 formed within the end surface 267 and generally within at least a portion of the head portion 264. The groove 292 define a passageway which allows gases created by the combustion process to escape from underneath the injector body 28 (FIG. 1) and communicate with the combustion chamber 46 (FIG. 1), for example through an air gap between the thermally conductive component 214 and the seal component 12 or 112. Although the illustrated embodiment illustrates two grooves 292*a* and 292*b*, more or fewer grooves 292 may be utilized so that ventilation of the combustion gases is efficient while allowing the thermally conductive component 214 to remain effective.

Use of any of the injector seal assembly embodiments disclosed provides the ability to keep the temperature of the fuel injector nozzle below a crucial limit or threshold temperature required to substantially prevent or mitigate the formation of carbon deposits on, for example, the tip or fuel outlet orifices of the fuel injector. As is generally known in the art, carbon deposits on a fuel injector will likely affect the performance and emissions profile of an exemplary internal combustion engine in which the injector is installed. For dual fuel engines that utilize a combination of diesel fuel and natural gas fuel to facilitate combustion, a high percentage of natural gas and a lower or reduced percentage of diesel fuel is a desirable and cost-effective method of operating these types of dual fuel engines. However, a reduction in the percentage of diesel fuel also increases the injector tip and nozzle temperatures experienced by the fuel injector during the combustion process. The seal assembly allows fuel flow through the diesel fuel injector to be significantly reduced when operating on a high level of natural gas. This reduction of the internal diesel fuel flow is enabled because of the substantial injector tip cooling and temperature reductions afforded by use of the seal assembly. Thus, the seal assemblies disclosed herein are an enabler for higher levels of natural gas substitution rate for the above mentioned dual fuel engines. Higher levels of substitution of a lower cost fuel (e.g. natural gas) may result in lower total cost of ownership for vehicle owners.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method for assembly of an injector seal that is positionable around an exterior of a fuel injector, the method comprising:

positioning a seal component around a longitudinally extending portion of a thermally conductive component, the thermally conductive component having a higher thermal conductivity than the seal component; and coupling the seal component with a head portion of the thermally conductive component that is located at an end of the longitudinally extending portion, the head portion including an end surface with at least one groove extending into the head portion.

2. The method of claim 1, further comprising positioning a nozzle housing of the fuel injector through the thermally conductive component after coupling the seal component with the head portion.

3. The method of claim 2, further comprising forming a press fit of the nozzle housing within the thermally conductive component.

4. The method of claim 2, further comprising forming a full press fit of the nozzle housing within the thermally conductive component so that substantially no gaps exist between the nozzle housing and the thermally conductive component.

5. The method of claim 1, wherein the coupling the seal component with the thermally conductive component includes press fitting the seal component into engagement with the head portion of the thermally conductive component.

6. The method of claim 1, further comprising inserting a seal between the seal component and the thermally conductive component.

7. The method of claim 1, wherein the coupling of the seal component with the head portion includes coupling the seal component with the head portion having at least two grooves in the end surface thereof.

8. The method of claim 1, further comprising inserting the fuel injector into the thermally conductive component until an injector body surface contacts a ring end surface of the seal component.

9. The method of claim 8, wherein inserting the fuel injector includes forming a gap between the end surface of the head and the injector body surface.

10. The method of claim 1, wherein the positioning includes positioning a stainless steel seal component around a copper thermally conductive component.

11. The method of claim 1, wherein the seal component is coupled to the head component before the injector seal is positioned around the exterior of the fuel injector.

12. The method of claim 1, wherein the coupling includes coupling the seal component with the head portion of the thermally conductive component so that the thermally conductive component is independently movable relative to the seal component.

13. A method for assembly of an injector seal that is positionable around an exterior of a fuel injector, the method comprising:

positioning a ring-shaped seal component around a cylindrical thermally conductive component, the thermally conductive component having a higher thermal conductivity than the seal component; and press fitting the ring-shaped seal component into engagement with a head portion located at an end of the cylindrical thermally conductive component, the head portion including an end surface with at least one groove extending into the head portion.

14. The method of claim 13, further comprising applying a thermal coating to the cylindrical thermally conductive component.

15. The method of claim 13, wherein the press fitting includes press fitting the ring-shaped seal component into engagement with an annular surface of the head portion.

16. The method of claim 13, wherein the press fitting includes press fitting an inner diameter of the ring-shaped seal component into engagement with an outer diameter of an annular surface of the head portion, the outer diameter being greater than the inner diameter.

17. The method of claim 13, wherein the press fitting includes press fitting the ring-shaped seal component into engagement with the head portion so that the ring-shaped seal component projects outwardly from the end surface of the head portion.

18. The method of claim 17, further comprising inserting the fuel injector through the thermally conductive component until a ring end surface of the ring-shaped seal contacts the fuel injector to form a gap formed between the end surface of the head portion and the fuel injector.

19. The method of claim 13, wherein the press-fitting includes press-fitting the ring-shaped seal component into engagement with the head portion having at least two grooves in the end surface thereof.

20. The method of claim 13, wherein the positioning includes positioning the ring-shaped seal component around the cylindrical thermally conductive component with a seal located within the seal component that extends around the cylindrical thermally conductive component.

* * * * *